(12) United States Patent
Merritt et al.

(10) Patent No.: US 8,378,031 B2
(45) Date of Patent: Feb. 19, 2013

(54) COATING COMPOSITION AND CURED FILM FORMED THEREFROM

(75) Inventors: William H. Merritt, Ferndale, MI (US); Nicholas Caiozzo, St. Clair Shores, MI (US); Sergio Balatan, West Bloomfield, MI (US); Walter H. Ohrbom, Hartland Township, MI (US); Gregory G. Menovcik, Northville, MI (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 13/207,263

(22) Filed: Aug. 10, 2011

(65) Prior Publication Data

US 2011/0294919 A1 Dec. 1, 2011

Related U.S. Application Data

(62) Division of application No. 12/179,936, filed on Jul. 25, 2008, now abandoned.

(51) Int. Cl.
*C08L 33/14* (2006.01)

(52) U.S. Cl. .................................... 525/208; 525/207

(58) Field of Classification Search .................. None
See application file for complete search history.

(56) References Cited

U.S. PATENT DOCUMENTS

| | | | |
|---|---|---|---|
| 3,998,905 A * | 12/1976 | Labana et al. | 523/437 |
| 5,241,001 A | 8/1993 | Kania et al. | |
| 5,436,311 A | 7/1995 | Hoebeke et al. | |
| 5,639,828 A | 6/1997 | Briggs et al. | |
| 6,437,056 B1 * | 8/2002 | Dahm et al. | 525/438 |
| 6,797,385 B2 | 9/2004 | Hart et al. | |
| 7,166,675 B2 | 1/2007 | Bartlett et al. | |
| 2003/0026908 A1 | 2/2003 | Lane et al. | |
| 2003/0069355 A1 | 4/2003 | Hart et al. | |
| 2003/0134978 A1 | 7/2003 | Tullos et al. | |
| 2004/0254307 A1 | 12/2004 | Mehta et al. | |
| 2006/0166001 A1 | 7/2006 | Moens et al. | |

FOREIGN PATENT DOCUMENTS

| | | | |
|---|---|---|---|
| JP | 5-171103 A | * | 7/1993 |
| JP | 5171103 A | | 7/1993 |
| JP | 2001-271023 A | * | 10/2001 |
| WO | WO2006063304 A1 | | 6/2006 |

OTHER PUBLICATIONS

Aronix data sheet including Aronix M-5300, w-carboxy-polycaprolactone monoacrylate, 2012, one page.*
Guidechem, Placcel FM 1, 6-hydroxy-2-[(2-methyl-1-oxo-2-propenyl)oxy]ethyl hexanoate, 2012, one page.*
Chemical abstracts registry No. 9003-08-1, Super Beckamine L117-60, melamine-formaldehyde polymer, 2012, one page.*

* cited by examiner

*Primary Examiner* — Robert Sellers
(74) *Attorney, Agent, or Firm* — Howard & Howard Attorneys PLLC

(57) ABSTRACT

A coating composition comprises a first copolymer and a second copolymer. The first copolymer has at least one linear polymer strand having a weight average molecular weight of at least 1,500 Daltons and functionality X with an equivalent weight of no more than 500. The second copolymer has at least one linear polymer strand having a weight average molecular weight of at least 1,500 Daltons and functionality X' with an equivalent weight of no more than 1,500. The coating composition is free of gloss flattening agents, yet still produces a cured film having a low gloss of less than 70 gloss units at an angle of incidence of 60°, as measured according to ASTM D 2457.

12 Claims, No Drawings

COATING COMPOSITION AND CURED FILM FORMED THEREFROM

CROSS-REFERENCE TO RELATED APPLICATIONS

This application is a divisional of Ser. No. 12/179,936, which was filed on Jul. 25, 2008.

FIELD OF THE INVENTION

The present invention generally relates to a coating composition. More specifically, the present invention relates to a coating composition which is free of gloss flattening agents yet still produces a cured film having low gloss.

DESCRIPTION OF THE RELATED ART

Coating compositions are known in the art and are applied to a substrate to form a cured film prior to an end use of the substrate. Typical end uses of the substrate include appliances, automotive parts, building and construction, and tractor-trailer equipment applications. The cured film is employed to provide aesthetic qualities and to increase durability and longevity of the substrate, such as by passivating the substrate, i.e., maximizing resistance to corrosion of the substrate. For example, it is advantageous to form the cured film on automotive parts because the cured film increases the durability and resistance to corrosion of the automotive parts, thereby increasing longevity of the automotive parts.

Coating compositions typically include a resin component, a cross-linking component, a solvent component, and one or more additive components, contingent on physical properties desired of the coating composition. Exemplary coating compositions are based on a chemistry selected from the group of acrylics, epoxies, fluorocarbons, polyesters, siliconized polyesters, plastisols, urethanes, acrylic waterbornes, and combinations thereof. The chemistry is usually selected based upon consideration for resistance to weathering, chemicals, dirt, and other natural elements when the coating composition is formed into the cured film.

Coating compositions have been used to alter and/or enhance surface appearance by forming either a low gloss cured film or a high gloss cured film. The high gloss cured film reflects a high proportion of light while, by contrast, the low gloss cured film reflects a low proportion of light. Low gloss cured films have less image impairment and, as such, are aesthetically more pleasing in particular end uses, such as the automotive parts. It is desirable for the automotive parts to have a durable and corrosion resistant coating via the low gloss cured film, i.e., it is not desirable for the automotive parts to have a shiny appearance that results from the high gloss cured film.

Whether the coating compositions form the low gloss cured film or the high gloss cured film is dependent on the chemistry of the coating compositions. It has been known to include a flattening agent, such as amorphous silicon dioxide, in the coating compositions to lower gloss of the cured films formed from the coating compositions. The resulting low gloss cured film has a low gloss that is directly proportional to the amount of the flattening agent included in the coating compositions, i.e., greater amounts of the flattening agent impart the low gloss cured film with a lower gloss. Therefore, to attain the low gloss cured films, coating compositions must be loaded with an excess amount of the flattening agent. The excess amount of the flattening agent in the coating compositions coagulates, thereby resulting in an undesirable "seedy" surface appearance of the resulting low gloss cured films. The surface of the low gloss cured film having the seedy appearance does not allow for reflection of light because the light is scattered at random angles by the surface, thereby imparting the low gloss cured film with the lower gloss. However, the surface of the low gloss cured film having the seedy appearance also has adverse effects on durability of the low gloss cured film because the flattening agent is eroded over time, which in turn erodes the low gloss cured film. In addition, the excessive amount of the flattening agents in the coating compositions typically makes the low gloss cured films more brittle than conventional cured films.

In view of the foregoing, there remains an opportunity to provide a coating composition that is free of a flattening agent yet forms a low gloss cured film. In addition, there remains an opportunity to provide a coating composition that is capable of forming a low gloss cured film having excellent durability and appearance.

SUMMARY OF THE INVENTION

The present invention provides a coating composition and a cured film formed from the coating composition. The coating composition comprises a first copolymer having at least one linear polymer strand having a weight average molecular weight of at least 1,500 Daltons and functionality X with an equivalent weight of no more than 500. The coating composition further comprises a second copolymer having at least one linear polymer strand having a weight average molecular weight of at least 1,500 Daltons and functionality X' with an equivalent weight of no more than 1,500. The functionality X of the first copolymer and the functionality X' of the second copolymer are reactive with one another.

The first copolymer and the second copolymer are reacted to form the cured film. The coating composition is free of gloss flattening agents, yet the coating composition produces a cured film having a low gloss. The low gloss of the cured film is less than 70 gloss units at an angle of incidence of 60°, as measured according to ASTM D 2457.

The coating composition of the present invention forms a cured film having excellent low gloss properties. The excellent low gloss properties are attributable to the first copolymer and the second copolymer, as opposed to flattening agents, and, as such, the low gloss properties of the cured film cannot be lessened and/or eliminated by polishing or otherwise smoothing a surface of the cured film. Therefore, the cured film also has excellent durability in comparison with other low gloss cured films that include gloss flattening agents because the gloss flattening agents degrade over time.

DETAILED DESCRIPTION OF THE INVENTION

The present invention provides a coating composition and a cured film having a low gloss that is formed from the coating composition. The cured film is free from a gloss flattening agent yet has low gloss comparable to that of cured films including a gloss flattening agent. The coating composition of the present invention is particularly useful in applications in which low gloss films are desirable, such as in automotive parts and bodies. However, it is to be appreciated that the coating composition is not limited to such applications; for example, the coating composition of the present invention can be used in other applications, such as in coil coatings. The cured film of the present invention has excellent durability when compared to cured films formed from coating compositions including the gloss flattening agents.

The coating composition of the present invention comprises a first copolymer. The first copolymer may be branched or linear; however, the first copolymer has at least one linear polymer strand having a weight average molecular weight of at least 1,500, typically from 1,500 to 20,000, more typically from 1,650 to 13,500, most typically from 1,800 to 7,000 Daltons. The term "polymer strand," as used herein, is to be interpreted as any segment of a polymer. It is to be appreciated that the segment of the polymer may comprise two or more repeating units, or the segment of the polymer may comprise a single non-repeating unit. The linear polymer strand may be a backbone of the first copolymer. Alternatively, the linear polymer strand may be a branch off of the backbone of the first copolymer so long as the branch is linear and has the weight average molecular weight as set forth above. In addition, the linear polymer strand may be a segment of a bifurcated polymer, i.e., a polymer having two segments, so long as the segment is linear and has the weight average molecular weight as set forth above. It is to be further appreciated that the linear polymer strand may still have groups pending therefrom (e.g. where the linear polymer strand is the backbone of the first copolymer); however, for the purposes of the instant invention, any groups pending from the linear polymer strand of the first copolymer do not factor in to the weight average molecular weight of the linear polymer strand of the first copolymer. The groups pending from the linear polymer strand of the first copolymer may be functional groups, i.e., groups reactive with other particular groups, or nonfunctional groups, i.e., unreactive groups. When the groups pending from the linear polymer strand of the first copolymer are functional groups, the functional groups may be pending from the linear polymer strand of the first copolymer via a divalent carbon chain. For illustrative purposes, formula 1 below depicts a polymer strand having groups pending therefrom, and the polymer strand is still within the definition of the term "linear" for the purposes of the present invention.

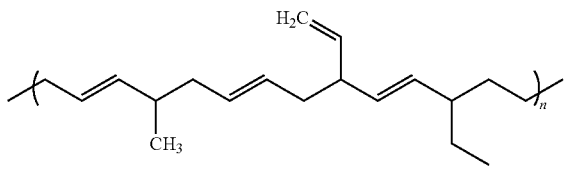

(1)

The linear polymer strand of the first copolymer has a functionality X having an equivalent weight of no more than 500 grams of the linear polymer strand of the first copolymer per mole of the functionality X. Equivalent weight, as used in the art of polymer chemistry and the present invention, denotes the amount of functional groups pending from, or forming a portion of, the linear polymer strand. Therefore, at least one mole of functionality X is present for every 500 grams of the linear polymer strand of the first copolymer. The functionality X is typically located at intervals along the linear polymer strand of the first copolymer. To calculate the equivalent weight, a functional group percentage is first calculated by determining a mass (in grams) of the functionality X per 100 grams of the linear polymer strand, and multiplying by 100. When the functionality X is randomly oriented throughout, or randomly pending from, the linear polymer strand of the first copolymer, an average percentage of functionality X may be used in the calculation. To calculate the equivalent weight, a molecular weight of the functionality X is divided by the percentage of the functionality X in the linear polymer strand of the first copolymer, and the quotient is multiplied by 100 to yield the equivalent weight. Therefore, linear polymer strands of the first copolymer having the functionality X with a higher equivalent weight have less of the functionality X than linear polymer strands having the functionality X with a lower equivalent weight.

The functionality X may be selected from functionalities including, but not limited to, hydroxy functionality, epoxy functionality, carbamate functionality, cyclic carbonate functionality, cyclic anhydride functionality, isocyanate functionality, aminoplast functionality, and alkoxy silane functionality. However, the functionality X is designated as a single functionality; for example, under some circumstances, the linear polymer strand of the first copolymer may have a combination of the functionalities set forth above, such as both epoxy functionality and hydroxy functionality, but only the epoxy functionality or only the hydroxy functionality is designated as the functionality X for the purposes of the calculation of the equivalent weight in accordance with the instant invention. It is to be appreciated that the linear polymer strand of the first copolymer of the present invention may have more than one type of functionality, i.e., functional groups different from the functionality X; however, the functional groups different from the functionality X are not aggregated in determining the equivalent weight of the linear polymer strand of the first copolymer. In other words, the equivalent weight is calculated based on a single type of functionality, i.e., the functionality X, of the linear polymer strand of the first copolymer. When the linear polymer strand of the first copolymer has more than one type of functionality, the functionality X is designated as the single type of functionality most prevalent in the linear polymer strand of the first copolymer, i.e., the single type of functionality having the lowest equivalent weight. For illustrative purposes only, formula 2 below represents an exemplary structure for the first copolymer in which the functionality X is designated in italics. In formula 2, when the functionality X is the epoxy functionality, the exemplary structure has an equivalent weight of 356.41 grams of the linear polymer strand of the first copolymer per mole of the functionality X. This is calculated by taking the molecular mass of the exemplary structure of formula 2 (including a molecular mass of 44.05 for each X, i.e., the epoxy functionality), which is 356.41, and normalizing the quotient of the molecular mass of the epoxy functionality to the molecular mass of the exemplary structure to determine a mass of the epoxy functionality per 100 grams of the linear polymer strand, yielding 12.36. Then, the molecular mass of the epoxy functionality (44.05) is divided by the mass of the epoxy functionality per 100 grams of the linear polymer strand (12.36), yielding 3.564. This is multiplied by 100 to yield the equivalent weight of the linear polymer strand of the first copolymer, which is 356.413 grams of the linear polymer strand of the first copolymer per mole of the functionality X. While the exemplary structure of formula 2 includes other functional groups, such as the hydroxy group, the other functional groups do not contribute to the equivalent weight of the linear polymer strand.

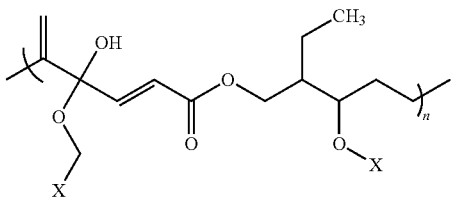

(2)

As set forth above, in certain embodiments of the present invention, the functionality X of the linear polymer strand of the first copolymer is epoxy functionality. When the functionality X of the linear polymer strand of the first copolymer is the epoxy functionality, the first copolymer is typically the reaction product of at least one first ethylenically unsaturated monomer (hereinafter "the first ethylenically unsaturated monomer") and at least one epoxy monomer (hereinafter "the epoxy monomer"). It is to be appreciated that a blend of ethylenically unsaturated monomers, i.e., two or more different types of ethylenically unsaturated monomers, may be utilized. In addition, it is to be appreciated that a blend of epoxy monomers, i.e., two or more different types of epoxy monomers, may be utilized. When the first copolymer is formed by reacting the first ethylenically unsaturated monomer and the epoxy monomer, the epoxy monomer is typically reacted in a total amount of at least 30, more typically from 30 to 80, most typically from 30 to 50 percent by weight based on the combined weight of the epoxy monomer and the first ethylenically unsaturated monomer on a pre-reaction weight basis. It is to be appreciated that when the first ethylenically unsaturated monomer and the epoxy monomer are reacted, the epoxy functionality of the epoxy monomer remains even after the reaction, i.e., the epoxy functionality does not react. Therefore, after reacting the first ethylenically unsaturated monomer and the epoxy monomer to form the first copolymer, the linear polymer strand of the first copolymer has the epoxy functionality, and the epoxy functionality of the epoxy monomer imparts the linear polymer strand of the first copolymer with the epoxy functionality. The epoxy monomer and the first ethylenically unsaturated monomer can be reacted by any method known in the art, such as in a reaction vessel. In certain embodiments, the first copolymer is formed by reacting the first ethylenically unsaturated monomer and the epoxy monomer in the reaction vessel at a temperature of from 60 to 200, more typically from 110 to 160, most typically from 120 to 150° C. for a period of time of from 1 to 8, more typically from 3 to 6, most typically from 3 to 4 hours.

In one embodiment, the epoxy monomer has at least one acryl group, i.e., the epoxy monomer is an acrylic epoxy monomer. Suitable acrylic epoxy monomers for the purposes of the present invention include, but are not limited to, glycidyl methacrylate and/or glycidyl acrylate. The acryl group of the acrylic epoxy monomer and the ethylenically unsaturated monomer react with one another to form the first copolymer. Therefore, as set forth above, it is not the epoxy functionality that reacts with the ethylenically unsaturated monomer and, as such, the linear polymer strand of the first copolymer has the epoxy functionality attributable to the epoxy monomer. As set forth above, the blend of epoxy monomers may be reacted with the first ethylenically unsaturated monomer to form the first copolymer. When the blend of the epoxy monomers is utilized, the acrylic epoxy monomer may be blended with epoxy monomers that are free from acryl groups. Alternatively, each of the epoxy monomers in the blend may be acrylic epoxy monomers or each of the epoxy monomers in the blend may be epoxy monomers that are free from acryl groups. For illustrative purposes, formulas 3 and 4 below depict the structure of glycidyl methacrylate and glycidyl acrylate, respectively.

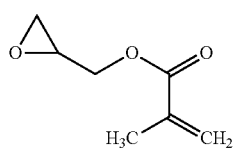

(3)

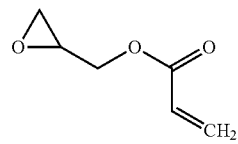

(4)

The first ethylenically unsaturated monomer that is reacted with the epoxy monomer to form the first copolymer can be any monomer having at least one carbon-carbon double bond, i.e., a vinyl or allyl group. In one embodiment, the first ethylenically unsaturated monomer is further defined as a first acrylic monomer; however, it is to be appreciated that the first acrylic monomer may comprise a blend of acrylic monomers, i.e., two or more acrylic monomers. The acryl group of the first acrylic monomer and the acryl group of the acrylic epoxy monomer are reactive with one another, and react to form the first copolymer. When the first ethylenically unsaturated monomer is the first acrylic monomer, the first acrylic monomer is typically selected from the group of acrylic acid ester having between 1 and 20 carbon atoms, methacrylic acid ester having between 1 and 20 carbon atoms, 2-ethylhexyl acrylate, methyl methacrylate, isobutyl methacrylate, 2-ethylhexyl methacrylate, 2-hydroxyethyl methacrylate, isobornyl methacrylate, isodecyl methacrylate, cyclohexyl methacrylate, aromatic ester, aromatic ether, and combinations thereof. It is to be appreciated that the first ethylenically unsaturated monomer may also have heteroatom linking groups such as oxygen, nitrogen, and/or silane.

The first ethylenically unsaturated monomer is typically utilized in an amount of from 10 to 70, more typically from 40 to 70, most typically from 50 to 70 percent by weight based on the combined weight of the epoxy monomer and the first ethylenically unsaturated monomer on a pre-reaction weight basis.

It is to be appreciated that when the first ethylenically unsaturated monomer is the first acrylic monomer, the first acrylic monomer may be used in concert with one or more of the ethylenically unsaturated monomers, i.e., with one or more monomers free from the acryl group. For example, the first acrylic monomer may be used in concert with styrene monomer. When the first acrylic monomer is used in concert with the styrene monomer, the styrene monomer is typically utilized in an amount of from greater than 0 to 20, more typically from greater than 0 to 15, most typically from greater than 0 to 10 percent by weight based on the combined weight of all of the components used to form the first copolymer on a pre-reaction weight basis.

In addition, the first acrylic monomer may have additional functional groups other than the acryl group. For example, the first acrylic monomer may include a vinyl group or a carbonyl group in addition to those in the acryl group. As a further example, when the functionality X of the linear polymer strand of the first copolymer is the epoxy functionality, the linear polymer strand may also have hydroxy functionality. When the first acrylic monomer has the additional functional groups, the first acrylic monomer is typically selected from the group of hydroxy functional acrylate monomer; the reaction product of 2,3-epoxypropyl neodecanoate and at least one of (meth)acrylic acid, (meth)acrylic acid ester, maleic anhydride, isocyanato alkyl methacrylate, and dimethyl-m-isopropenylbenzyl isocyanate; and combinations thereof. Each of the suitable examples of the first acrylic monomer exemplified above has both the acryl group as well as the additional functional group, such as a hydroxy group. It is to be appreciated that when the first acrylic monomer has the additional functional groups, it may be utilized in concert with the first acrylic monomer only having the acryl group and/or with the monomer that is free from the acryl group, such as the styrene monomer. When utilized, the first acrylic monomer having the additional functional groups is typically utilized in an amount of from greater than 0 to 70, more typically from 5 to 40, most typically from 10 to 40 percent by weight based on the combined weight of all of the components used to form the first copolymer on a pre-reaction weight basis.

The coating composition further comprises a second copolymer. The second copolymer is different from the first copolymer. The second copolymer may be branched or linear; however, the second copolymer has at least one linear polymer strand having a weight average molecular weight of at least 1,500, typically from 1,500 to 20,000, more typically from 1,650 to 13,500, most typically from 1,800 to 7,000 Daltons. For example, the linear polymer strand may be a backbone of the second copolymer. Alternatively, the linear polymer strand may be a branch off of the backbone of the second copolymer so long as the branch is linear and has the weight average molecular weight as set forth above. In addition, the linear polymer strand may be a segment of a bifurcated polymer, i.e., a polymer having two segments, so long as the segment is linear and has the weight average molecular weight of as set forth above. The linear polymer strand of the second copolymer is to be interpreted under the definitions of "linear" and "polymer strand" set forth above. Consequently, it is to be appreciated that the segment of the polymer may comprise two or more repeating units, or the segment of the polymer may comprise a single non-repeating unit. In addition, formula 1, which illustrates how the term "linear" is to be interpreted, applies to the linear polymer strand of the second copolymer as well.

The linear polymer strand of the second copolymer has functionality X' having an equivalent weight of no more than 1,500 grams of the linear polymer strand of the second copolymer per mole of the functionality X'. Therefore, at least one mole of functionality X' is present for every 1,500 grams of the linear polymer strand of the second copolymer. The functionality X' of the linear polymer strand of the second copolymer is different than the functionality X of the linear polymer strand of the first copolymer. The functionality X' of the linear polymer strand of the second copolymer and the functionality X of the linear polymer strand of the first copolymer are reactive with one another. The functionality X' of the linear polymer strand of the second copolymer may be selected from functionalities including, but not limited to, carboxylic acid functionality, isocyanate functionality, aminoplast functionality, amine functionality, and alkoxy silane functionality. It is to be appreciated that the linear polymer strand of the second copolymer of the present invention may have more than one type of functionality, i.e., different types of functionalities; however, the different functionalities are not aggregated in determining the equivalent weight of the linear polymer strand of the second copolymer. In other words, the equivalent weight is calculated based on a single type of functionality, i.e., the functionality X', of the linear polymer strand of the second copolymer, though the linear polymer strand of the second copolymer may have additional types of functionalities not contributing to the equivalent weight of the linear polymer strand of the second copolymer. For illustrative purposes only, formula 5 below represents an exemplary structure of the linear polymer strand of the second copolymer in which the functionality X' is designated by X', in italics. In formula 5, the exemplary structure includes other types of functionalities, such as the hydroxy group, though the other types of functionalities do not contribute to the equivalent weight of the linear polymer strand of the second copolymer.

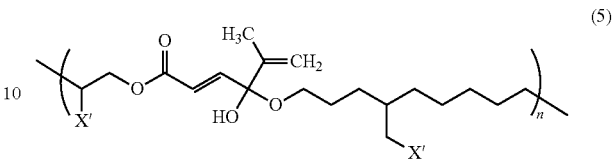
(5)

As set forth above, the functionality X of the linear polymer strand of the first copolymer is reactive with the functionality X' of the linear polymer strand of the second copolymer. In addition, the functionality X' of the linear polymer strand of the second copolymer is typically located at intervals along the linear polymer strand of the second copolymer different than the intervals at which the functionality X is located along the linear polymer strand of the first copolymer. When the functionality X is the epoxy functionality, the epoxy functionality is reactive with many functional groups, such as amines, carboxylic acids, anhydrides, and hydroxy-containing polymers, thereby allowing the functionality X' to be chosen based on desired properties of the cured film formed from reacting the first copolymer and the second copolymer.

When the functionality X of the linear polymer strand of the first copolymer is epoxy functionality, the functionality X' of the linear polymer strand of the second copolymer is typically carboxylic acid functionality. However, it is to be appreciated that the functionality X' of the linear polymer strand of the second copolymer may be the carboxylic acid functionality even when the functionality X of the linear polymer strand of the first copolymer is not the epoxy functionality, provided that the functionality X of the linear polymer strand of the first copolymer is still reactive with the functionality X' of the linear polymer strand of the second copolymer.

When the functionality X' of the linear polymer strand of the second copolymer is the carboxylic acid functionality, the second copolymer is typically the reaction product of at least one carboxylic acid monomer (hereinafter "the carboxylic acid monomer") and at least one second ethylenically unsaturated monomer (hereinafter "the second ethylenically unsaturated monomer"). It is to be appreciated that a blend of ethylenically unsaturated monomers, i.e., two or more different types of ethylenically unsaturated monomers, may be utilized. In addition, it is to be appreciated that a blend of carboxylic acid monomers, i.e., two or more different types of carboxylic acid monomers, may be utilized. When the second copolymer is formed by reacting the carboxylic acid monomer and the second ethylenically unsaturated monomer, the carboxylic acid monomer is typically reacted in an amount of at least 6.5, more typically from 10 to 80, most typically from 10 to 65 percent by weight based on the combined weight of the carboxylic acid monomer and the second ethylenically unsaturated monomer on a pre-reaction weight basis. The carboxylic acid monomer and the second ethylenically unsaturated monomer can be reacted by any method known in the art, such as in the reaction vessel. In certain embodiments, the second copolymer is formed by reacting the second ethylenically unsaturated monomer and the carboxylic acid monomer in the reaction vessel at a temperature of from 60 to 200, more typically from 110 to 160, most typically from 120 to 150° C. for a period of time of from 1 to 8, more typically from 3 to 6, most typically from 3 to 4 hours.

The carboxylic acid monomer can be any monomer having carboxylic acid functionality, i.e., a COOH group. In one embodiment, the carboxylic acid monomer has at least one acryl group, i.e., the carboxylic acid monomer is an acrylic carboxylic acid monomer. As set forth above, a blend of carboxylic acid monomers, i.e., two or more different types of carboxylic acid monomers, may be reacted with the second ethylenically unsaturated monomer to form the second copolymer. When the blend of the carboxylic acid monomers is utilized, the acrylic carboxylic acid monomer may be blended with the carboxylic acid monomer that is free from the acryl group. Suitable carboxylic acid monomers for purposes of the present invention include, but are not limited to, methacrylic acid; acrylic acid; beta-carboxyethyl acrylate; acrylic acid dimer; methacrylic acid dimer; maleic acid; itaconic acid; the reaction product of cyclic anhydride and hydroxy functional acrylic monomer; the reaction product of alkyl substituted cyclic anhydride and hydroxy functional acrylic monomer; the reaction product of 2,3-epoxypropyl neodecanoate, (meth)acrylic acid, and cyclic anhydride; and combinations thereof.

The second ethylenically unsaturated monomer that is reacted with the carboxylic acid monomer to form second copolymer can be any monomer having at least one carbon-carbon double bond, i.e., a vinyl and/or allyl group. In one embodiment, the second ethylenically unsaturated monomer is a second acrylic monomer; however, it is to be appreciated that the second acrylic monomer may comprise a blend of acrylic monomers, i.e., two or more different types of acrylic monomers. When the second ethylenically unsaturated monomer is the second acrylic monomer, the second acrylic monomer can be the same as or different from the first acrylic monomer, i.e., the second acrylic monomer is typically selected from the group of acrylic acid ester having between 1 and 20 carbon atoms, methacrylic acid ester having between 1 and 20 carbon atoms, 2-ethylhexyl acrylate, methyl methacrylate, isobutyl methacrylate, 2-ethylhexyl methacrylate, 2-hydroxyethyl methacrylate, isobornyl methacrylate, isodecyl methacrylate, cyclohexyl methacrylate, aromatic ester, aromatic ether, and combinations thereof.

The second ethylenically unsaturated monomer is typically utilized in an amount of from 10 to 70, more typically from 40 to 70, most typically from 50 to 70 percent by weight based on the combined weight of the carboxylic acid monomer and the second ethylenically unsaturated monomer on a pre-reaction weight basis.

It is to be appreciated that when the second ethylenically unsaturated monomer is the second acrylic monomer, the second acrylic monomer may be used in concert with one or more types of the ethylenically unsaturated monomers, i.e., with one or more monomers free from the acryl group. For example, the second acrylic monomer may be used in concert with styrene monomer. When the second acrylic monomer is used in concert with the styrene monomer, the styrene monomer is typically utilized in an amount of from greater than 0 to 20, more typically from greater than 0 to 15, most typically from greater than 0 to 10 percent by weight based on the combined weight of all of the components used to form the second copolymer on a pre-reaction weight basis.

In addition, the second acrylic monomer may have additional functional groups, i.e., a functionality X", other than the acryl group. The additional functional groups may be the same as or different from the additional functional groups that may be present in the first acrylic monomer. When the second acrylic monomer has the functionality X", the second acrylic monomer is typically selected from the group of hydroxy functional acrylate monomer; the reaction product of 2,3-epoxypropyl neodecanoate and at least one of (meth)acrylic acid, (meth)acrylic acid ester, maleic anhydride, isocyanato alkyl methacrylate, and dimethyl-m-isopropenylbenzyl isocyanate; and combinations thereof. Each of the second acrylic monomers exemplified above has both the acryl group as well as the functionality X", such as the hydroxy group. It is to be appreciated that when the second acrylic monomer has the functionality X", it may be utilized in concert with the second acrylic monomer only having the acryl group and/or with the monomer that is free from the acryl group, such as the styrene monomer.

At least one of the first acrylic monomer and the second acrylic monomer has the additional functional group such that the linear polymer strand of the first copolymer and/or the linear polymer strand of the second copolymer have the functionality X", which is different than the functionality X of the linear polymer strand of the first copolymer and different than the functionality X' of the linear polymer strand of the second copolymer. In one embodiment, the second acrylic monomer has the additional functional group such that the second copolymer, which is the reaction product of the second acrylic monomer and the carboxylic acid monomer, has the functionality X". In addition to being different from the functionality X of the linear polymer strand of the first copolymer and the functionality X' of the linear polymer strand of the second copolymer, the functionality X" is typically unreactive with or in the presence of the functionality X of the linear polymer strand of the first copolymer and functionality X' of the linear polymer strand of the second copolymer. When the functionality X" is present in the linear polymer strand of the second copolymer, the functionality X" typically has an equivalent weight of from 166 to 4,000, more typically from 290 to 2,320, most typically from 290 to 1,160 grams of the linear polymer strand of the second copolymer per mole of the functionality X".

As set forth and exemplified above, the second copolymer is typically imparted with the functionality X" by utilizing the second acrylic monomer having the functionality X" pending therefrom. After reacting the second acrylic monomer and the carboxylic acid monomer to form the second copolymer, the functionality X" is integrated in and/or throughout the second copolymer. Examples of the functionality X" suitable for the purposes of the present invention include hydroxy functionality, phenolic functionality, carbamate functionality, alkoxy silane functionality, and isocyanate functionality. When the functionality X" is the isocyanate functionality, the isocyanate functionality may be free or blocked. In one embodiment of the present invention, the functionality X" is hydroxy functionality. In this embodiment, at least one of the first copolymer and the second copolymer comprises more than one different type of monomer, with one of the monomers being a hydroxy-functional acrylic monomer to impart at least one of the first copolymer and the second copolymer, respectively, with the hydroxy functionality. The hydroxy functional acrylic monomer is typically selected from the group of hydroxy functional acrylate monomer; the reaction product of 2,3-epoxypropyl neodecanoate and at least one of (meth)acrylic acid, (meth)acrylic acid ester, maleic anhydride, isocyanato alkyl methacrylate, and dimethyl-m-isopropenylbenzyl isocyanate; and combinations thereof. When the functionality X" is present in the second copolymer, the hydroxy functional acrylic monomer is typically utilized in an amount of from greater than 0 to 70, more typically from 5 to 40, most typically from 10 to 40 percent by weight based on the combined weight of all of the components used to form the second copolymer on a pre-reaction weight basis.

When the second copolymer of the present invention includes the functionality X", the coating composition typically further comprises a cross-linking agent that is reactive with the functionality X". When the functionality X" is the hydroxy functionality, suitable examples of the cross-linking agent include melamine, isocyanurate, and combinations thereof, each of which reacts with hydroxy functionality. The cross-linking agent is utilized in the coating composition to increase a cross-link density of the cured film formed therefrom. The cross-linking agent also imparts the cured film formed from the coating composition with excellent durability and adhesion to a substrate. Without intending to be limited by theory, it is also believed that the amount of cross-linking agent included in the coating composition is directly proportional to the low gloss of the cured film. Therefore, the low gloss of the cured film can be altered based on the amount of the cross-linking agent utilized in the coating composition. When the second copolymer has the functionality X", the cross-linking agent is typically utilized in an amount of from greater than 0 to 40, more typically from greater than 0 to 35, most typically from greater than 0 to 30 percent by weight based on the combined weight of the first and second copolymers on a pre-reaction weight basis.

It is to be appreciated that the coating composition may further comprise at least one additive component, i.e., one or more additive components. For example, one additive component may be a thixotropic agent to increase a viscosity of the coating composition. As another example, one additive component may be a light stabilizer, such as a hindered amine light stabilizer. One additive component may be a solvent, such as aromatic 100 and/or butoxyl. However, the coating composition is free of gloss flattening agents, i.e., the additive component is not a gloss flattening agent.

The total amount of the additive component, when included in the coating composition, is typically of from greater than 0 to 10, more typically from 1 to 7, most typically from 1.5 to 4.5 percent by weight based on the total weight of the coating composition.

To form the cured film, the first copolymer and the second copolymer are reacted with one another; the functionality X of the linear polymer strand of the first copolymer and the functionality X' of the linear polymer strand of the second copolymer react with one another, thereby forming the cured film, which is cross-linked, i.e., the functionality X of the linear polymer strand of the first copolymer and the functionality X' of the linear polymer strand of the second copolymer cross-link when reacted with one another. When the second copolymer includes the functionality X", the cross-linking agent may be reacted with the functionality X" to further cross-link the coating composition to form the cured film. The cross-linking agent may be present in the coating composition prior to curing the coating composition to form the cured film, i.e., the coating composition may be a one component system. Alternatively, the cross-linking agent may be mixed in the coating composition immediately prior to spraying and/or curing the coating composition to form the cured film, i.e., the coating composition may be a two component system. Without intending to be limited by theory, it is believed that the functionality X is located at intervals along the linear polymer strand of the first copolymer different than intervals at which the functionality X' is located along the linear polymer strand of the second copolymer. Therefore, when the functionality X of the linear polymer strand of the first copolymer and the functionality X' of the linear polymer strand of the second copolymer react with one another, at least one of the linear polymer strands may reconfigure due to the improper alignment of the functionality X and the functionality X'. In other words, bond angles within at least one of the linear polymer strands of the first and second copolymers with expand or retract such that the functionality X of the linear polymer strand of the first copolymer and the functionality X' of the linear polymer strand of the second copolymer may react with one another with minimized steric hindrance. Therefore, it is to be appreciated that when the equivalent weights of the linear polymer strands of the first and second copolymers are lower, the reconfiguration of the linear polymer strands will be maximized as there is a greater presence of the functionality X and the functionality X'. However, even if only one of the linear polymer strands of the first and second copolymers has a high degree of functionality, e.g. a low equivalent weight, there will be reconfiguration of at least one of the linear polymer strands of the first and second copolymers and a corresponding low gloss in the cured film formed from reacting the first and second copolymers. This reconfiguration causes areas of "stress" in the cured film, which imparts the cured film with the low gloss. In addition, without intending to be limited by theory, it is believed that the distance between the functionality X and the linear polymer strand of the first copolymer as well as the distance between the functionality X' and the linear polymer strand of the second copolymer further contributes to the stress of the cured film formed by reacting the first and second copolymers. When the second copolymer has the functionality X", the reaction between the functionality X" and the cross-linking agent further increases the cross-linking density of the cured film formed from the coating composition, thereby increasing the durability of the cured film. This is advantageous because the excellent low gloss properties are attributable to the first copolymer and the second copolymer, as opposed to flattening agents, and, as such, the low gloss properties of the cured film cannot be lessened and/or eliminated by polishing or otherwise smoothing a surface of the cured film. The cured film typically has a gloss of from 5 to less than 70, more typically from 10 to 50, most typically from 20 to 40 gloss units at an angle of incidence of 60°, as measured according to ASTM D 2457.

In addition to having excellent low gloss properties, the cured film of the present invention also has excellent gloss retention, i.e, the cured film has excellent low gloss properties even after exposure to the elements. The cured film of the present invention typically has a gloss retention of from 60 to 100, more typically from 70 to 100, most typically from 80 to 100 percent after being exposed to a weatherometer for 2,900 hours. The gloss retention is attributable to the low gloss being an inherent property of the cured film rather than the low gloss being attributable to gloss flattening agents. For example, the gloss flattening agents typically erode during exposure to the elements and, as such, gloss retention may be poor.

The following examples, illustrating the method of forming the coating composition of the present invention, are intended to illustrate and not to limit the invention.

EXAMPLES

A coating composition comprises a first copolymer and a second copolymer. The first copolymer and the second copolymer are separately formed. Each respective composition for the first copolymer and the second copolymer is exemplified below.

First Copolymer

The amount and type of each component used to form the first copolymer is indicated in Table I below with all values in parts by weight based on 100 parts by weight of the combined components prior to reaction to make the first copolymer unless otherwise indicated.

TABLE I

First Copolymer

| Group | Component | Wt. % |
|---|---|---|
| a) | Solvent 1 | 29.53 |
| b) | Solvent 1 | 1.87 |
|  | Ethylenically unsaturated monomer 1 | 15.46 |
|  | Ethylenically unsaturated monomer 2 | 5.62 |
|  | Ethylenically unsaturated monomer 3 | 7.03 |
|  | Epoxy monomer | 28.11 |
|  | Free radical initiator 1 | 0.80 |
|  | Free radical initiator 2 | 1.61 |
| c) | Solvent 1 | 1.34 |
| d) | Solvent 1 | 3.48 |
|  | Ethylenically unsaturated monomer 1 | 1.27 |
|  | Ethylenically unsaturated monomer 2 | 0.59 |
|  | Free radical initiator 1 | 0.28 |
|  | Free radical initiator 2 | 0.56 |
|  | Ethylenically unsaturated monomer 4 | 1.10 |
| e) | Solvent 1 | 1.34 |
|  | Total: | 100.00 |

Solvent 1 is aromatic 100, commercially available from Exxon Mobil Corporation of Irving, TX.
Ethylenically unsaturated monomer 1 is 2-ethylhexyl acrylate, commercially available from BASF Corp. of Florham Park, NJ.
Ethylenically unsaturated monomer 2 is styrene, commercially available from Sigma Aldrich Corporation of St. Louis, MO.
Ethylenically unsaturated monomer 3 is methyl methacrylate, commercially available from Sigma Aldrich Corporation of St. Louis, MO.
Epoxy monomer is glycidyl methacrylate, commercially available from the Dow Chemical Co. of Midland, MI.
Free radical initiator 1 is t-butyl peroxy-2-ethylhexanoate, commercially available from Akzo Nobel Co. of Chicago, IL.
Free radical initiator 2 is t-butyl peroxy acetate in octahedral molecular sieve, commercially available from Akzo Nobel Co. of Chicago, IL.
Ethylenically unsaturated monomer 4 is 2-hydroxyethyl acrylate, commercially available from BASF Corp. of Florham Park, NJ.

Referring now to Table I, to form the first copolymer, Group (a), is heated in a reaction vessel having an inert atmosphere to a temperature of 140° C. After attaining the temperature of 140° C., Group (b) is slowly added to Group (a) in the reaction vessel over a period of 4 hours while maintaining the temperature of 140° C. in the reaction vessel. After Group (b) is added to Group (a) in the reaction vessel over the period of 4 hours, Group (c) is added in the reaction vessel and the resulting mixture is held for one hour at the temperature of 140° C. After one hour at the temperature of 140° C., Group (d) is added to the reaction mixture in the reaction vessel over a period of 30 minutes. Finally, Group (e) is added to the reaction mixture in the reaction vessel and the resulting mixture is held for two hours at the temperature of 140° C. to form the first copolymer. The first copolymer has epoxy functionality attributable to the glycidyl methacrylate used in forming the first copolymer. In addition, the first copolymer has hydroxy functionality attributable to the 2-hydroxyethyl acrylate used in forming the first copolymer.

Second Copolymer 1-4

The second copolymer can be formed from varying amounts of different monomers. For illustrative purposes, four alternatives of the second copolymer are exemplified below, detailed as second copolymer 1 through second copolymer 4, respectively. Each will be described consecutively.

Second Copolymer 1

The amount and type of each component used to form the second copolymer 1 of the coating composition is indicated in Table II below with all values in parts by weight based on 100 parts by weight of the combined components prior to reaction to make the second copolymer 1 unless otherwise indicated.

TABLE II

Second Copolymer 1

| Group | Component | Wt. % |
|---|---|---|
| a) | Solvent 1 | 15.00 |
|  | Solvent 2 | 15.00 |
| b) | Ethylenically unsaturated monomer 5 | 28.92 |
|  | Ethylenically unsaturated monomer 1 | 7.80 |
|  | Ethylenically unsaturated monomer 6 | 3.00 |
|  | Carboxylic acid monomer 1 | 10.80 |
|  | Ethylenically unsaturated monomer 7 | 3.48 |
|  | E-caprolactone | 6.00 |
| c) | Free radical initiator 1 | 3.00 |
| d) | Solvent 1 | 1.00 |
| e) | Solvent 1 | 0.50 |
|  | Free radical initiator 1 | 0.50 |
| f) | Solvent 3 | 5.00 |
|  | Total: | 100.00 |

Solvent 2 is 3-methoxyl butyl acetate, commercially available from Celanese Ltd. of Dallas, TX.
Ethylenically unsaturated monomer 5 is isobutyl methacrylate, commercially available from Arkema, Inc. of Philadelphia, PA.
Ethylenically unsaturated monomer 6 2-ethylhexyl methacrylate, commercially available from BASF Corp. of Florham Park, NJ.
Carboxylic acid monomer 1 is acrylic acid, commercially available from BASF Corp. of Florham Park, NJ.
Ethylenically unsaturated monomer 7 is 2-hydroxyethyl methacrylate, commercially available from BASF Corp. of Florham Park, NJ.
E-caprolactone is commercially available from BASF Corp. of Florham Park, NJ.
Solvent 3 is n-butanol, commercially available from BASF Corp. of Florham Park, NJ.

Referring now to Table II, to form the second copolymer 1, Group (a) is heated in a reaction vessel to a temperature of 155° C. under an inert atmosphere. After attaining the temperature of 155° C., Group (b) and Group (c) are slowly added to Group (a) in the reaction vessel over a period of 3 hours while maintaining the temperature of 155° C. in the reaction vessel. After Group (b) and Group (c) are added to Group (a) in the reaction vessel over the period of 3 hours, the reaction vessel is flushed with a portion of Group (d), and the remainder of Group (d) is then added to the reaction vessel. The temperature of the reaction vessel is maintained at 155° C. for 30 minutes. After maintaining the temperature of the reaction vessel at 155° C. for 30 minutes, the temperature of the reaction vessel is decreased to 140° C. After decreasing the temperature of the reaction vessel to 140° C., Group (e) is added in the reaction vessel over a period of 15 minutes. The temperature of the reaction vessel is then held at 140° C. for two hours. After two hours, the temperature of the reaction vessel is decreased to 110° C., and Group (f) is added to the reaction vessel. After the resulting reaction mixture becomes homogenous, it can be poured, thereby forming the second copolymer 1. The second copolymer 1 has carboxylic acid functionality attributable to the acrylic acid used in forming the second copolymer 1. In addition, the second copolymer 1 has hydroxy functionality attributable to the 2-hydroxyethyl methacrylate used to form the second copolymer 1.

Second Copolymer 2

The amount and type of each component used to form the second copolymer 2 of the coating composition are indicated in Table III below with all values in parts by weight based on 100 parts by weight of the combined components prior to reaction to make the second copolymer 2 unless otherwise indicated.

TABLE III

Second Copolymer 2

| Group | Component | Wt. % |
|---|---|---|
| a) | Solvent 1 | 15.00 |
|  | Solvent 2 | 15.00 |
| b) | Ethylenically unsaturated monomer 8 | 13.80 |
|  | Ethylenically unsaturated monomer 9 | 14.82 |
|  | Ethylenically unsaturated monomer 1 | 9.00 |
|  | Carboxylic acid monomer 2 | 12.90 |
|  | Ethylenically unsaturated monomer 7 | 3.48 |
|  | E-caprolactone | 6.00 |
| c) | Solvent 1 | 0.50 |
|  | Free radical initiator 1 | 3.00 |
| d) | Solvent 1 | 0.50 |
| e) | Solvent 1 | 0.50 |
|  | Free radical initiator 1 | 0.50 |
| f) | Solvent 3 | 5.00 |
|  | Total: | 100.00 |

Ethylenically unsaturated monomer 8 is isobornyl methacrylate, commercially available from Sigma-Aldrich Co. of St. Louis, MO.
Ethylenically unsaturated monomer 9 is isodecyl methacrylate, commercially available from Rohm and Haas Co. of Philadelphia, PA.
Carboxylic acid monomer 2 is methacrylic acid, commercially available from BASF Corp. of Florham Park, NJ.

Referring now to Table III, to form the second copolymer 2, Group (a) is heated in a reaction vessel to a temperature of 155° C. under an inert atmosphere. After attaining the temperature of 155° C., Group (b) and Group (c) are slowly added to Group (a) in the reaction vessel over a period of 3 hours while maintaining the temperature of 155° C. in the reaction vessel. After Group (b) and Group (c) are added to Group (a) in the reaction vessel over the period of 3 hours, the reaction vessel is flushed with a portion of Group (d), and the remainder of Group (d) is then added to the reaction vessel. The temperature of the reaction vessel is maintained at 155° C. for 30 minutes. After maintaining the temperature of the reaction vessel at 155° C. for 30 minutes, the temperature of the reaction vessel is decreased to 140° C. After decreasing the temperature of the reaction vessel to 140° C., Group (e) is added in the reaction vessel over a period of 15 minutes. The temperature of the reaction vessel is then held at 140° C. for two hours. After two hours, the temperature of the reaction vessel is decreased to 110° C., and Group (f) is added to the reaction vessel. After the resulting reaction mixture becomes homogenous, it can be poured and filtered, thereby forming the second copolymer 2. The second copolymer 2 has carboxylic acid functionality attributable to the methacrylic acid used in forming the second copolymer 2. In addition, the second copolymer 2 has hydroxy functionality attributable to the 2-hydroxyethyl methacrylate used to form the second copolymer 2.

Second Copolymer 3

The amount and type of each component used to form the second copolymer 3 of the coating composition are indicated in Table IV below with all values in parts by weight based on 100 parts by weight of the combined components prior to reaction to make the second copolymer 3 unless otherwise indicated.

TABLE IV

Second Copolymer 3

| Group | Component | Wt. % |
|---|---|---|
| a) | Solvent 1 | 15.00 |
|  | Solvent 2 | 15.00 |
| b) | Ethylenically unsaturated monomer 9 | 20.00 |
|  | Ethylenically unsaturated monomer 10 | 12.00 |
|  | Carboxylic acid monomer 2 | 6.50 |
|  | Ethylenically unsaturated monomer 11 | 12.00 |
|  | Ethylenically unsaturated monomer 7 | 3.50 |
|  | E-caprolactone | 6.00 |
| c) | Solvent 1 | 0.50 |
|  | Free radical initiator 1 | 3.00 |
| d) | Solvent 1 | 0.50 |
| e) | Solvent 1 | 0.50 |
|  | Free radical initiator 1 | 0.50 |
| f) | Solvent 3 | 5.00 |
|  | Total: | 100.00 |

Ethylenically unsaturated monomer 10 is beta-carboxyethyl acrylate, commercially available from UCB Chemicals of Smyrna, GA.
Ethylenically unsaturated monomer 11 is cyclohexyl methacrylate commercially available from Sigma-Aldrich Co. of St. Louis, MO.

Referring now to Table IV, to form the second copolymer 3, Group (a) is heated in a reaction vessel to a temperature of 155° C. under an inert atmosphere. After attaining the temperature of 155° C., Group (b) and Group (c) are slowly added to Group (a) in the reaction vessel over a period of 3 hours while maintaining the temperature of 155° C. in the reaction vessel. After Group (b) and Group (c) are added to Group (a) in the reaction vessel over the period of 3 hours, the reaction vessel is flushed with a portion of Group (d), and the remainder of Group (d) is then added to the reaction vessel. The temperature of the reaction vessel is maintained at 155° C. for 30 minutes. After maintaining the temperature of the reaction vessel at 155° C. for 30 minutes, the temperature of the reaction vessel is decreased to 140° C. After decreasing the temperature of the reaction vessel to 140° C., Group (e) is added in the reaction vessel over a period of 15 minutes. The temperature of the reaction vessel is then held at 140° C. for two hours. After two hours, the temperature of the reaction vessel is decreased to 110° C., and Group (f) is added to the reaction vessel. After the resulting reaction mixture becomes homogenous, it can be poured and filtered, thereby forming the second copolymer 3. The second copolymer 3 has carboxylic acid functionality attributable to the methacrylic acid used in forming the second copolymer 3. In addition, the second copolymer 3 has hydroxy functionality attributable to the 2-hydroxyethyl methacrylate used in forming the second copolymer 3.

Second Copolymer 4

The amount and type of each component used to form the second copolymer 4 of the coating composition are indicated in Table V below with all values in parts by weight based on 100 parts by weight of the combined components prior to reaction to make the second copolymer 4 unless otherwise indicated.

TABLE V

Second Copolymer 4

| Group | Component | Wt. % |
|---|---|---|
| a) | Solvent 1 | 15.00 |
|  | Solvent 2 | 15.00 |
| b) | Ethylenically unsaturated monomer 9 | 23.10 |
|  | Carboxylic acid monomer 2 | 12.90 |
|  | Ethylenically unsaturated monomer 11 | 14.50 |
|  | Ethylenically unsaturated monomer 7 | 3.50 |
|  | E-caprolactone | 6.00 |

TABLE V-continued

| | Second Copolymer 4 | |
|---|---|---|
| Group | Component | Wt. % |
| c) | Solvent 1 | 0.50 |
| | Free radical initiator 1 | 3.00 |
| d) | Solvent 1 | 0.50 |
| e) | Solvent 1 | 0.50 |
| | Free radical initiator 1 | 0.50 |
| f) | Solvent 3 | 5.00 |
| | Total: | 100.00 |

Referring now to Table V, to form the second copolymer 4, Group (a) is heated in a reaction vessel to a temperature of 155° C. under an inert atmosphere. After attaining the temperature of 155° C., Group (b) and Group (c) are slowly added to Group (a) in the reaction vessel over a period of 3 hours while maintaining the temperature of 155° C. in the reaction vessel. After Group (b) and Group (c) are added to Group (a) in the reaction vessel over the period of 3 hours, the reaction vessel is flushed with a portion of Group (d), and the remainder of Group (d) is then added to the reaction vessel. The temperature of the reaction vessel is maintained at 155° C. for 30 minutes. After maintaining the temperature of the reaction vessel at 155° C. for 30 minutes, the temperature of the reaction vessel is decreased to 140° C. After decreasing the temperature of the reaction vessel to 140° C., Group (e) is added in the reaction vessel over a period of 15 minutes. The temperature of the reaction vessel is then held at 140° C. for two hours. After two hours, the temperature of the reaction vessel is decreased to 110° C., and Group (f) is added to the reaction vessel. After the resulting reaction mixture becomes homogenous, it can be poured and filtered, thereby forming the second copolymer 4. The second copolymer 4 has carboxylic acid functionality attributable to the methacrylic acid used in forming the second copolymer 4. In addition, the second copolymer 4 has hydroxy functionality attributable to the 2-hydroxyethyl methacrylate used in forming the second copolymer 4.

Coating Compositions

Four coating compositions are formed, corresponding to Examples 1-5, wherein each of the four coating compositions utilizes one of the second copolymer 1, the second copolymer 2, the second copolymer 3, and the second copolymer 4, respectively. The four coating compositions are set forth and exemplified in Table VI below. The amount and type of each component used to form each of the four coating compositions are indicated in Table VI below with all values in parts by weight based on 100 parts by weight of the combined weight of the components prior to reaction unless otherwise indicated.

TABLE VI

| | Example 1 | Example 2 | Example 3 | Example 4 |
|---|---|---|---|---|
| First Copolymer | 47.9 | 47.2 | 47.2 | 47.2 |
| Second Copolymer 1 | 33.6 | — | — | — |
| Second Copolymer 2 | — | 34.6 | — | — |
| Second Copolymer 3 | — | — | 34.3 | — |
| Second Copolymer 4 | — | — | — | 34.3 |
| Component A | 2.9 | 2.8 | 2.8 | 2.8 |
| Component B | 1.2 | 1.2 | 1.2 | 1.2 |
| Component C | 0.8 | 0.8 | 0.8 | 0.8 |
| Component D | 0.5 | 0.5 | 0.5 | 0.5 |
| Component E | 0.5 | 0.5 | 0.5 | 0.5 |
| Component F | 0.2 | 0.2 | 0.2 | 0.2 |
| Component G | 0.01 | 0.01 | 0.01 | 0.01 |
| Component H | 2.9 | 2.7 | 2.8 | 2.8 |
| Component I | 3.8 | 3.8 | 3.9 | 3.9 |
| Component J | 3.8 | 3.8 | 3.9 | 3.9 |
| Component K | 1.9 | 1.9 | 1.9 | 1.9 |
| Total: | 100.0 | 100.0 | 100.0 | 100.0 |

Component A is melamine, commercially available from INEOS Melamines of Springfield, MA.
Component B is Tinuvin 400, commercially available from Ciba Specialty Chemicals Corp. of Tarrytown, NY.
Component C is Tinuvin 123, commercially available from Ciba Specialty Chemicals Corp. of Tarrytown, NY.
Component D is a thixotropic agent, commercially available from Kusumoto Chemicals Ltd. of Tokyo, Japan.
Component E is Additol XL 480, commercially available from UCB Chemicals of Smyrna, GA.
Component F is Flowlen AC 300, commercially available from Tego Chemie Service GmbH of Essen, Germany.
Component G is an amine blocked paratoluene sulfonic acid catalyst from King Industries, Norwalk CT.
Component H is aromatic 100, commercially available from Exxon Mobil Corporation of Irving, TX.
Component I is methanol.
Component J is butanol.
Component K is 2-ethyl hexanol.

To form the first of the four coating compositions, the first copolymer set forth and exemplified in Table I is mixed with the second copolymer 1 set forth and exemplified in Table II under agitation. The coating composition was applied to a waterborne basecoat which is adhered to an e-coated steel substrate and cured at a temperature of 285° F. for 30 minutes to form a cured film. The cured film had a low gloss of less than 46 gloss units at an angle of incidence of 60°, as measured according to ASTM D 2457. The cured film had a gloss retention of 100 percent after being exposed to a weatherometer for 2,914 hours.

To form the second of the four coating compositions, the first copolymer set forth and exemplified in Table I is mixed with the second copolymer 2 set forth and exemplified in Table III under agitation. The coating composition was applied to a waterborne basecoat which is adhered to an e-coated steel substrate and cured at a temperature of 285° F. for 30 minutes to form a cured film. The cured film had a low gloss of less than 64 gloss units at an angle of incidence of 60°, as measured according to ASTM D 2457. The cured film had a gloss retention of 95 percent after being exposed to a weatherometer for 2,914 hours.

To form the third of the four coating compositions, the first copolymer set forth and exemplified in Table I is mixed with the second copolymer 3 set forth and exemplified in Table IV under agitation. The coating composition was applied to a waterborne basecoat which is adhered to an e-coated steel substrate and cured at a temperature of 285° F. for 30 minutes to form a cured film. The cured film had a low gloss of less than 87 gloss units at an angle of incidence of 60°, as measured according to ASTM D 2457. The cured film had a gloss retention of 98 percent after being exposed to a weatherometer for 2,914 hours.

To form the fourth of the four coating compositions, the first copolymer set forth and exemplified in Table I is mixed with the second copolymer 4 set forth and exemplified in Table V under agitation. The coating composition was applied to a waterborne basecoat which is adhered to an e-coated steel substrate and cured at a temperature of 285° F. for 30 minutes to form a cured film. The cured film had a low gloss of less than 56 gloss units at an angle of incidence of 60°, as measured according to ASTM D 2457. The cured film had a gloss retention of 93 percent after being exposed to a weatherometer for 2,914 hours.

The present invention has been described herein in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described above.

What is claimed is:

1. A coating composition which is free of gloss flattening agents yet still produces a cured film having a low gloss of less than 70 gloss units at an angle of incidence of 60°, as measured according to ASTM D 2457, said coating composition comprising:
   (A) a first copolymer having at least one linear polymer strand having a weight average molecular weight of at least 1,500 Daltons and epoxy functionality with an equivalent weight of no more than 500;
   (B) a second copolymer having at least one linear polymer strand having a weight average molecular weight of at least 1,500 Daltons and carboxylic acid functionality with an equivalent weight of no more than 1,500;
   wherein said first copolymer is the reaction product of at least one first ethylenically unsaturated monomer and at least one epoxy monomer;
   wherein said second copolymer is the reaction product of at least one second ethylenically unsaturated monomer and at least one carboxylic acid monomer;
   wherein said at least one carboxylic acid monomer is reacted in an amount of at least 6.5% by weight based on the combined weight of said at least one second ethylenically unsaturated monomer and said at least one carboxylic acid monomer to produce said second copolymer;
   wherein said epoxy functionality of said first copolymer and said carboxylic acid functionality of said second copolymer are reactive with one another to form the cured film;
   wherein said second copolymer has functionality X" which is selected from the group consisting of phenolic functionality, carbamate functionality, alkoxy silane functionality, and isocyanate functionality; and
   a cross-linking agent reactive with said functionality X" of said second copolymer.

2. A coating composition as set forth in claim 1 wherein said at least one epoxy monomer is reacted in an amount of at least 30% by weight based on the combined weight of said at least one first ethylenically unsaturated monomer and said at least one epoxy monomer.

3. A coating composition as set forth in claim 1 wherein said at least one epoxy monomer of said first copolymer is further defined as at least one of glycidyl methacrylate and glycidyl acrylate.

4. A coating composition as set forth in claim 1 wherein said at least one first ethylenically unsaturated monomer of said first copolymer is further defined as at least one first acrylic monomer.

5. A coating composition as set forth in claim 1 wherein said at least one carboxylic acid monomer of said second copolymer is selected from the group of methacrylic acid; acrylic acid; beta-carboxyethyl acrylate; acrylic acid dimer; methacrylic acid dimer; maleic acid; itaconic acid; the reaction product of cyclic anhydride and hydroxy functional acrylic monomer; the reaction product of alkyl substituted cyclic anhydride and hydroxy functional acrylic monomer; the reaction product of 2,3-epoxypropyl neodecanoate, (meth)acrylic acid, and cyclic anhydride; and combinations thereof.

6. A coating composition as set forth in claim 1 wherein said at least one second ethylenically unsaturated monomer of said second copolymer is further defined as at least one second acrylic monomer.

7. A coating composition as set forth in claim 1 wherein at least one of said at least one first ethylenically unsaturated monomer of said first copolymer and said at least one second ethylenically unsaturated monomer of said second copolymer further comprises styrene monomer.

8. A coating composition as set forth in claim 1 wherein said functionality X" has an equivalent weight of from 290 to 2,320.

9. A coating composition as set forth in claim 1 wherein said cross-linking agent is selected from the group of melamine, isocyanurate, and combinations thereof.

10. A low gloss cured film comprising the reaction product of:
    (A) a first copolymer having at least one linear polymer strand having a weight average molecular weight of at least 1,500 Daltons and epoxy functionality with an equivalent weight of no more than 500;
    (B) a second copolymer different than said first copolymer and having at least one linear polymer strand having a weight average molecular weight of at least 1,500 Daltons and carboxylic acid functionality having an equivalent weight of no more than 1,500;
    wherein said first copolymer is the reaction product of at least one first ethylenically unsaturated monomer and at least one epoxy monomer;
    wherein said second copolymer is the reaction product of at least one second ethylenically unsaturated monomer and at least one carboxylic acid monomer;
    wherein said at least one carboxylic acid monomer is reacted in an amount of at least 6.5% by weight based on the combined weight of said at least one second ethylenically unsaturated monomer and said at least one carboxylic acid monomer to produce said second copolymer; and
    wherein said second copolymer has functionality X" which is selected from the group consisting of phenolic functionality, carbamate functionality, alkoxy silane functionality, and isocyanate functionality; and
    a cross-linking agent reactive with said functionality X";
    wherein said low gloss cured film is free of gloss flattening agents and has a gloss of less than 70 gloss units at an angle of incidence of 60°, as measured according to ASTM D 2457.

11. A low gloss cured film as set forth in claim 10 wherein said gloss is less than 60 at an angle of incidence of 60°, as measured according to ASTM D 2457.

12. A low gloss cured film as set forth in claim 10 wherein said cross-linking agent is selected from the group of melamine, isocyanurate, and combinations thereof.

* * * * *